July 6, 1954  M. S. HUNTER  2,683,196
CLEARANCE INDICATOR FOR VEHICLES
Filed Sept. 27, 1951
2 Sheets-Sheet 1
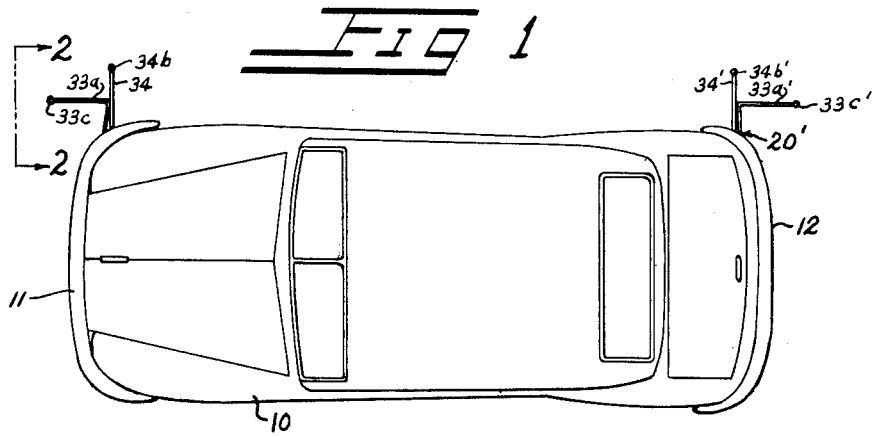
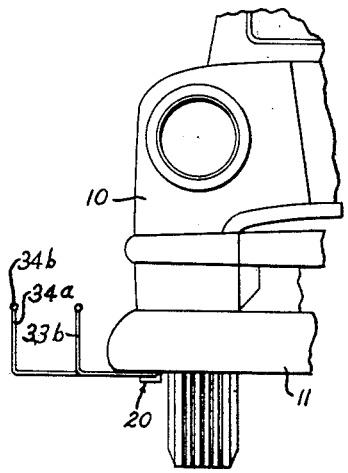
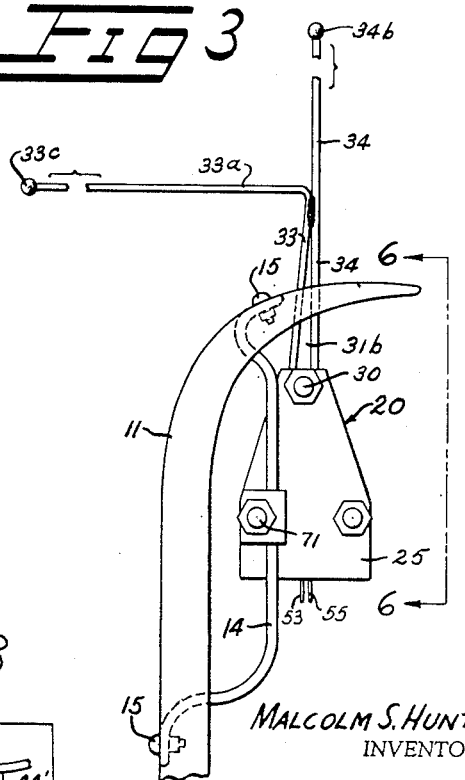
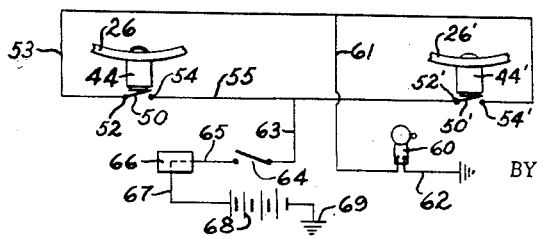
MALCOLM S. HUNTER,
INVENTOR.
BY Eaton + Bell
ATTORNEYS.

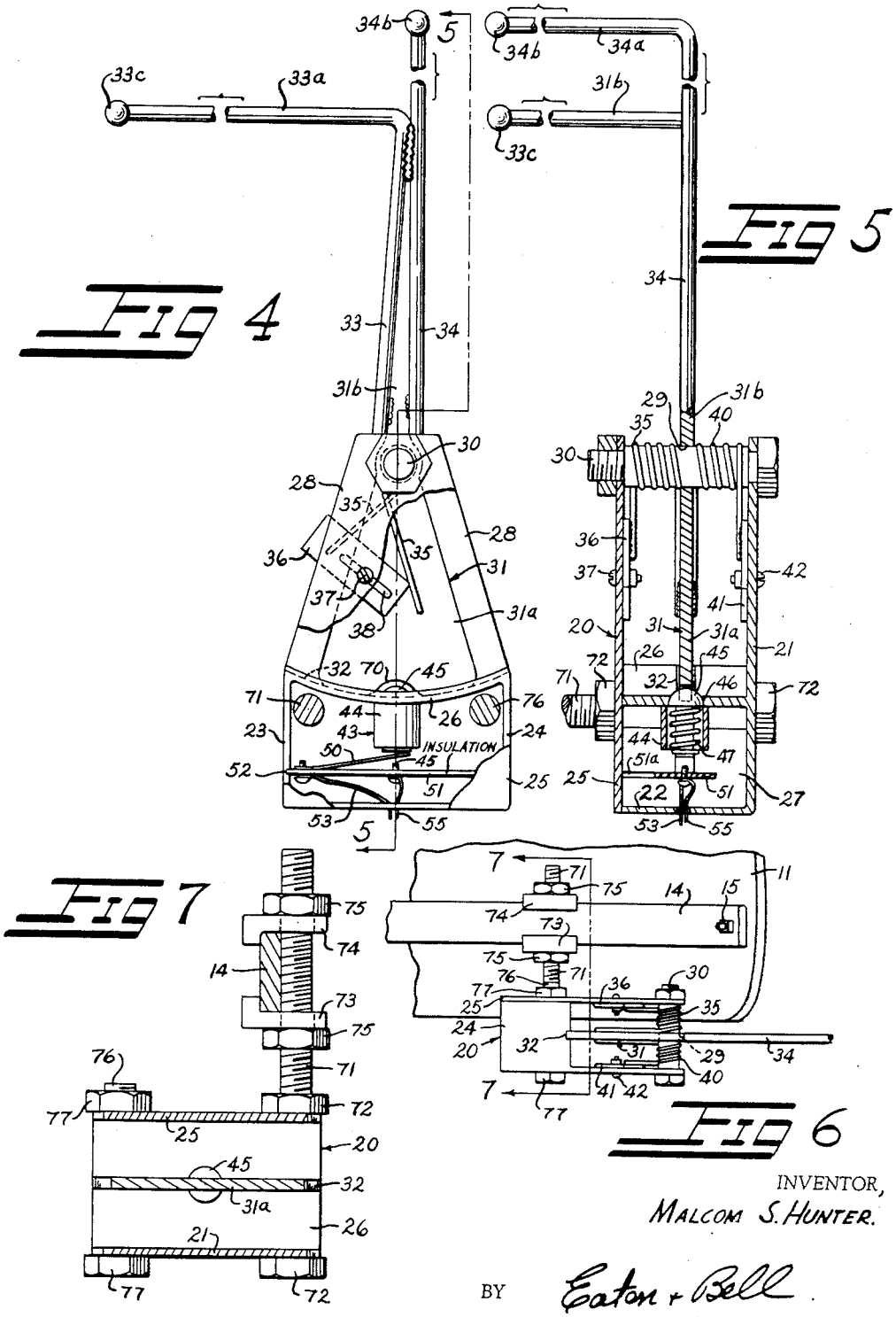

Patented July 6, 1954

2,683,196

UNITED STATES PATENT OFFICE 2,683,196

CLEARANCE INDICATOR FOR VEHICLES

Malcolm S. Hunter, Columbia, S. C.

Application September 27, 1951, Serial No. 248,599

1 Claim. (Cl. 200—61.44)

This invention relates to an improved clearance indicator for vehicles and more particularly to that type of indicator which is adapted to be associated with an automotive vehicle and is utilized to close a circuit to a signaling device in said vehicle for warning the driver of obstructions and the like.

It is well known that in parking automobiles, it frequently happens that the curb is engaged by the tires of the automobile which is injurious to the tires and in many instances, particularly in parallel parking, the automobile engages the fender or bumper of another automobile causing damage thereto. Many attempts have been made to provide a satisfactory detecting means to be associated with an automotive vehicle for engaging objects to warn the driver of the vehicle of his proximity thereto.

It is an object of this invention to provide an improved detecting means or clearance indicator of novel construction embodying a pendulum type switch with detector arms or feelers associated therewith and wherein said feelers are so positioned as to be engaged by a fender or bumper of adjacent vehicles as the automobile is being parked to thus close the pendulum type of switch to actuate a signaling device to warn the driver of his proximity to other vehicles.

It is another object of this invention to provide a simplified device of the class described having a housing readily mounted on the front and rear bumpers of a vehicle and said housing having a pendulum type switch mounted therein and detector arms extending from said switch and said detector arms being provided with upstanding portions of approximately the width of an automobile bumper whereby, upon said detector arms being engaged by a bumper or fender of another vehicle, the pendulum type switch will be moved to close a circuit to a signaling device in the vehicle with which they are associated.

Some of the objects of the invention having been stated, other objects will appear as the description proceeds when taken in connection with the accompanying drawings, in which—

Figure 1 is a top plan view of a vehicle showing a pair of the improved clearance indicators associated therewith;

Figure 2 is a fragmentary front elevation looking substantially along the line 2—2 in Figure 1 and showing the manner in which the front indicator is associated with the bumper of the vehicle;

Figure 3 is an enlarged fragmentary top plan view of the indicator connected to the bumper of a vehicle;

Figure 4 is an enlarged top plan view of the indicator removed from the vehicle with parts broken away for purposes of clarity;

Figure 5 is a vertical sectional view through the indicator taken along the line 5—5 in Figure 4;

Figure 6 is a fragmentary side elevation of the indicator associated with the bumper and looking along the line 6—6 in Figure 3;

Figure 7 is a vertical sectional view taken along the line 7—7 in Figure 6 and showing one manner in which the indicator may be connected to a bumper support arm;

Figure 8 is a schematic electrical diagram showing the manner in which the detectors may be arranged in the electrical circuit of a vehicle.

Referring more specifically to the drawings, the numeral 10 indicates an automotive vehicle having a front bumper 11 and a rear bumper 12, which bumpers are suitably secured to the vehicle by any conventional or other means such as bumper support members 14 (Figures 3, 6 and 7) suitably secured to the frame of the vehicle and also secured to the bumpers as by bolts 15.

The improved clearance indicator broadly designated at 20 is suitably attached to the front of the automotive vehicle as by connecting the same to the bumper support member 14 or, if desired, the indicator 20 may be connected to the bumper 11. An indicator 20' may be suitably connected to the rear of the vehicle in a like manner. The indicators 20 and 20' are of identical construction and, therefore, only the front indicator 20 will be described in detail and like parts of the rear indicator 20' will bear like reference characters with the prime notation added. Additional indicators may be used if desired. In the preferred installation of the indicators 20 and 20', the indicator 20 is connected to the front right-hand side of the vehicle 10 and the indicator 20' is connected to the rear right-hand side of the vehicle to serve as clearance indicators when the vehicle is being parked or is moved adjacent other vehicles or objects on its right-hand side.

The improved clearance indicator 20 comprises a housing having a bottom wall 21, an end wall 22 and side walls 23 and 24. A removable cover 25 forms the top wall and is of the same configuration as the bottom wall 21. The side walls 23 and 24 are of a lesser width than the length of the top and bottom walls 25 and 21, respectively. An arcuate plate 26 is secured to or formed integral with the bottom wall 21 of the housing and extends transversely thereof and is positioned intermediate the ends of said housing. The side walls 23 and 24 extend to the edge of the arcuate plate 26 to thus form a switch housing or enclosure 27. The enclosure 27 is adapted to have a switch, to be described, therein and is closed to prevent dirt and the like from coming into contact with said switch. The top 25 and bottom 21 of the housing extend substantially beyond the arcuate plate 26 and this portion of this housing is open at its sides. The top and bottom plates 25 and 21 are preferably tapered at their edges from the transverse plate 26 to the end of the housing as at 28.

Pivotally mounted in the housing as by a bolt 30 extending through the plates 25 and 21 at the ends thereof remote from the arcuate plate 26 is a pendulum type switch control plate 31. The switch control plate 31 has a substantially triangular portion 31a which is horizontally disposed intermediate the bottom and top plates 21 and 25 of the housing and the base edge of the portion 31a of the switch control plate 31 is curved to conform to the surface of the arcuate plate 26 and preferably has horizontal sliding movement in a slot 32 extending transversely of the arcuate plate 26 and positioned midway between the upper and lower edges thereof. It will be observed that the portion of the bolt 30 between the bottom and top walls 21 and 25 of the housing is preferably enlarged and the apex of the triangularly-shaped portion 31a of the switch control plate 31 has a bore 29 therethrough which is slidably penetrated by the enlarged portion of the bolt 30 so that the switch control plate may pivot about the bolt 30. The switch control plate 31 has a tapered portion 31b extending outwardly from said housing beyond the bolt 30.

Detector arms or feelers 33 and 34, respectively, are secured to opposed edges of the tapered portion 31b of the switch control plate 31 by any suitable means such as welding. The detector arm 33 extends outwardly adjacent the portion 31b of the switch control plate 31 and then extends at right angles thereto as at 33a and then extends upwardly as at 33b and may be rounded at the free end thereof as at 33c if so desired. The length of the portion 33b is preferably substantially the same as or greater than the width of an average vehicle bumper. The detector arm 34 extends outwardly adjacent the portion 31b of the switch control plate 31 for a distance substantially greater than that at which the detector 33 extends outwardly adjacent the portion 31b and the detector 34 then extends upwardly at right angles as at 34a and may be rounded at its end as at 34b. The portion 34a of the detector 34 is preferably of the same length as the portion 33b of the detector 33.

A torsion spring 35 surrounds the upper portion of the bolt 30 and has one end thereof adjustably mounted on the lower surface of the top plate 25 as by a nut 37 penetrating a slot 38 in an adjustable spring anchor 36 to which the spring 35 is fixedly connected. The other end of the torsion spring 35 is suitably secured to the upper surface of the switch control plate 31 by any suitable means such as welding. A similar torsion spring 40 is positioned about the lower portion of the bolt 30 and has the upper end thereof suitably connected to the lower surface of the switch control plate 31 as by welding and the lower end thereof is fixedly connected to an adjustment plate 41 adjustably secured to the bottom 21 of the housing as by a bolt 42 penetrating a slot in said adjustment plate 41 similar to the slot 38 in the adjustment plate 36. The torsion spring 35 serves to urge the switch control plate 31 about the bolt 30 in one direction and the torsion spring 40 serves to urge the switch control plate 31 about the bolt 30 in another direction so that these springs 35 and 40 counterbalance each other to normally hold the switch control plate in a center position or substantially as shown in Figures 4 and 5 with the pendulum portion 31a of the switch control plate 31 so disposed as not to engage the switch to be described. The springs 35 and 40 also serve to position the switch control plate 31 intermediate the bottom wall 21 and the top plate 25 of the clearance indicator housing.

A spring pressed plunger type switch broadly designated at 43 is positioned within the enclosed portion 27 of the housing of the clearance indicator 20 and this switch 43 includes a tubular portion 44 secured to the arcuate wall 22 and which has a plunger 45 slidably mounted therein which plunger is provided with a rounded head portion which slidably penetrates an opening 46 in the arcuate wall 26 adjacent the tubular portion 44. A spring 47 surrounds the plunger 45 and normally urges the same to a position where the head thereof will extend through the arcuate plate 26. The other end of the plunger 45 engages one end of a leaf spring arm 50 secured at the other end thereof to a plate member 51 extending transversely of the housing and connected at each end thereof to the side walls 23 and 24 in any suitable manner as by a pressed fit in slots 51a in the side walls 23 and 24. The plate 51 is preferably of insulation material but, if desired, suitable insulation may be provided thereon at the point at which other elements contact the same. The leaf spring 50 is preferably connected to the plate 51 as by a contact 52. A wire 53 leads from the contact 52 to a circuit connecting said switch with a suitable signaling device in said automotive vehicle. A second contact 54 is secured to said plate 51 adjacent the end of the leaf spring 50 which is in engagement with the plunger 45 of the switch 43 whereby upon the plunger 45 being depressed against the leaf spring 50, the leaf spring 50 will be moved into contact with the contact 54 for closing the switch. A wire 55 leads from the contact 54 to a suitable source of electrical energy.

Referring to Figure 8, it will be observed that two of the improved clearance indicators are preferably used and these indicators may be connected in a circuit with the automobile's electrical system so as to actuate a signaling device such as a light or alarm or, as indicated in Figure 8 for purposes of illustration, a buzzer 60. The wire 53 connects the contact 52 of the indicator 20 with a contact 54' of the indicator 20'. A wire 61 is connected at one end thereof to the wire 53 intermediate the contacts 52 and 54' and has the other end thereof connected to one side of the alarm device 60. A wire 62 leads from the other side of the alarm 60 to a suitable ground. The wire 55 leads from the contact 54 of the indicator 20 to the contact 52' of the indicator 20'. A wire 63 leads from the wire 55 to one side of the main ignition switch 64 of the vehicle from the other side of which a wire 65 leads to the junction box 66 of the vehicle from which a wire 67 leads to the conventional battery 68 which is grounded as at 69.

It will thus be seen that upon the leaf spring 50 engaging the contact 52, a circuit will be closed to the alarm device 60 provided the ignition switch 64 is closed. In a like manner, upon the leaf spring 50' closing the associated contacts of the indicator 20', a circuit to the alarm 60 will be closed to signal the driver of the vehicle.

It will thus be seen that the detector arms or feelers 33 and 34 are so positioned as to engage the bumper of an adjacent car as the automotive vehicle 10 is being parked. Upon the feeler or detector arms being engaged, the switch control plate 31 will pivot about the bolt 30 and it will be observed in Figures 4 and 6 that the switch control plate is provided with a cut away portion 70 midway of the curved surface which rides in the groove 32 in the arcuate plate 26. When the switch control plate 31 is in normal position as shown in Figure 4, this cut away portion 70 will fit over the plunger 45 of the switch 43. Upon one of the detector arms being engaged, the switch control plate will pivot to cause the curved end thereof to ride onto the plunger 45 to depress the same to actuate the leaf spring 50 for closing the circuit to the alarm device which is visible or audible to the driver of the vehicle thus warning him of his proximity to an adjacent vehicle or other object.

The improved clearance indicators 20 and 20' may be secured to the vehicle or to the bumpers of the vehicle, or as illustrated, may be secured to the bumper support arm 14, in any suitable manner. Referring to Figure 7, it will be observed that one means of securing the improved clearance indicators to the bumper support arm 14 may comprise an elongated bolt 71 which extends through suitable bores in the bottom 21 and top 25 of the indicator housing and is held in position therein as by a nut 72. Oppositely directed L-shaped clamps 73 and 74 are slidably positioned on the bolt 71 with the flanges thereof extending over the bumper support arm 14 and suitable nuts 75 are provided for holding the clamps 73 and 74 in engagement with the bumper support arm 14 for supporting the improved clearance indicator. The top plate 25 of the housing for the clearance indicator is secured in position by means of the bolt 71 and also by means of a second bolt 76 extending therethrough and secured in position as by a nut 77.

It will thus be observed that there is provided an improved clearance indicator for vehicles which is particularly useful in parallel or diagonal parking and which is of simplified construction embodying a new type of pendulum switch having feeler or detector arms associated therewith wherein positive and immediate response is obtained upon movement of said detector arms.

In the drawings and specification, there has been set forth a preferred embodiment of the invention and although specific terms are employed, they are used in a generic and descriptive sense only and not for purposes of limitation, the scope of the invention being defined in the claim.

I claim:

An improved clearance indicator for vehicles having a switch and a housing for the switch, said housing comprising a bottom wall, an end wall, a top wall, and an intermediate arcuate plate spanning the distance between said top and bottom walls and positioned in spaced relation to said end wall and intermediate the opposite ends of the top and bottom walls, said arcuate plate having a groove therein extending thereacross, side walls extending between said top and bottom walls and between said end wall and said intermediate plate to thus form a closed portion at one end of said housing and an open portion at the other end of said housing, said switch being mounted in said closed portion of said housing and having a plunger extending through said arcuate plate, a shaft mounted between the free ends of said top and bottom walls at the open end of said housing, a pendulum member pivotally mounted on said shaft, said pendulum member having an arcuate end slidable in said arcuate groove and having a portion thereof cut away and normally positioned out of engagement with said plunger, springs positioned about said shaft and serving to position the pendulum member intermediate the top and bottom walls and out of engagement with the plunger of said switch, detector arms secured to said pendulum member and extending outwardly therefrom and adapted to be engaged by an object in proximity to said vehicle, whereby movement of said detector arms will cause said pendulum member to pivot about said shaft against the urging of said springs and to engage said plunger of said switch for closing the switch.

References Cited in the file of this patent

UNITED STATES PATENTS

| Number | Name | Date |
|---|---|---|
| 706,084 | Moskowitz | Aug. 5, 1902 |
| 1,196,662 | Cheleron et al. | Aug. 29, 1916 |
| 2,021,568 | North et al. | Nov. 19, 1935 |
| 2,060,771 | Kempf | Nov. 10, 1936 |
| 2,259,614 | Chang | Oct. 21, 1941 |
| 2,440,587 | Krall | Apr. 27, 1948 |